(12) United States Patent
Shaffer et al.

(10) Patent No.: US 6,249,814 B1
(45) Date of Patent: Jun. 19, 2001

(54) METHOD AND APPARATUS FOR IDENTIFYING DEVICES ON A NETWORK

(75) Inventors: David S. Shaffer; Richard A. Stupek, Jr.; William D. Justice, Jr., all of Houston, TX (US)

(73) Assignee: Compaq Computer Corporation, Houston, TX (US)

( * ) Notice: Subject to any disclaimer, the term of this patent is extended or adjusted under 35 U.S.C. 154(b) by 0 days.

(21) Appl. No.: 08/934,636

(22) Filed: Sep. 22, 1997

(51) Int. Cl.[7] .................................................. G06F 15/173

(52) U.S. Cl. .......................... 709/223; 709/224; 709/245

(58) Field of Search ........................ 395/200.54, 200.68, 395/200.75; 709/224, 238, 245, 223

(56) References Cited

U.S. PATENT DOCUMENTS

| | | | | |
|---|---|---|---|---|
| 5,097,469 | * | 3/1992 | Douglas | 371/20.1 |
| 5,185,860 | * | 2/1993 | Wu | 709/224 |
| 5,668,952 | * | 9/1997 | Slane | 395/200.75 |
| 5,687,320 | * | 11/1997 | Wiley et al. | 395/200.16 |
| 5,724,510 | * | 3/1998 | Arndt et al. | 395/200.5 |
| 5,805,818 | * | 9/1998 | Perlman et al. | 709/224 |
| 5,835,720 | * | 11/1998 | Nelson et al. | 395/200.54 |
| 5,838,907 | * | 11/1998 | Hansen | 709/220 |
| 5,841,775 | * | 11/1998 | Huang | 370/422 |
| 5,862,404 | * | 1/1999 | Onaga | 395/828 |
| 5,968,116 | * | 10/1999 | Day, II et al. | 709/202 |
| 6,032,193 | * | 2/2000 | Sullivan | 709/239 |
| 6,061,722 | * | 5/2000 | Lipa et al. | 709/224 |

OTHER PUBLICATIONS

Deering, *Host Extensions for IP Multicasting*, Internet, Request for Comments: 1054, Stanford University (May 1988), 17 pgs.

Armstrong et al., *Multicast Transport Protocol*, Internet, Request for Comments 1301, Xerox et al., (Feb. 1992), 33 pgs.

Deering, *Host Extensions for IP Multicasting*, Internet, Request for Comments: 988, Stanford University (Jul. 1986), 18 pgs.

Wimer, *Clarifications and Extensions for the Bootstrap Protocol*, Internet, Request for Comments 1542, Carnegie Mellon University (Oct. 1993), 19 pgs.

Croft et al., *Bootstrap Protocol (BOOTP)*, Internet, Request for Comments 951, Stanford University et al. (Sep. 1985), 10 pgs.

Alexander et al., *DHCP Options and BOOTP Vendor Extensions*, Internet, Request for Comments 1533, Lachman Technology, Inc. et al., (Oct. 1993), 25 pgs.

Droms, *Dynamic Host Configuration Protocol*, Internet, Request for Comments 1541, Bucknell University (Oct. 1993), 32 pgs.

Reynolds, *BOOTP Vendor Information Extensions*, Internet, Request for Comments 1497, ISI (Aug. 1993), 7 pgs.

Case et al., *A Simple Network Management Protocol (SNMP)*, Internet, Request for Comments 1157, SNMP Research et al. (May 1990), 32 pgs.

(List continued on next page.)

*Primary Examiner*—Saleh Najjar
(74) *Attorney, Agent, or Firm*—Fletcher, Yoder & Van Someren

(57) ABSTRACT

A method and apparatus for identifying devices on a network. A management device is configured to multicast a query message to request identification of network devices. Each of the network devices is configured to respond to the management device multicast message by transmitting a reply message containing identification information of the responding device. The management device includes a directory containing the identification information of the network devices. The network protocol can include the TCP/IP protocol, and the packets have a format complying with a bootstrap protocol.

18 Claims, 8 Drawing Sheets

OTHER PUBLICATIONS

Socolofsky et al., *A TCP/IP Tutorial*, Internet, Request for Comments 1180, Spider Systems Ltd. (Jan. 1991), 25 pgs.

Kessler et al., *A Primer on Internet and TCP/IP Tools*, Internet, Request for Comments 1739, Hill Assoc., Inc. (Dec. 1994), 40 pgs.

Allen, *Novell IPX Over Various Wan Media (IPXWAN)*, Internet, Request for Comments 1634, Novell, Inc. (May 1994), 19 pgs.

Hewlett Packard, *HP Openview Professional Developer's Kit—Version D.01*, Internet Web Page (1996), 3 pgs.

Hewlett Packard, *HP Openview Workgroup Node Manager*, Internet, Web Page (1994), 3 pgs.

* cited by examiner

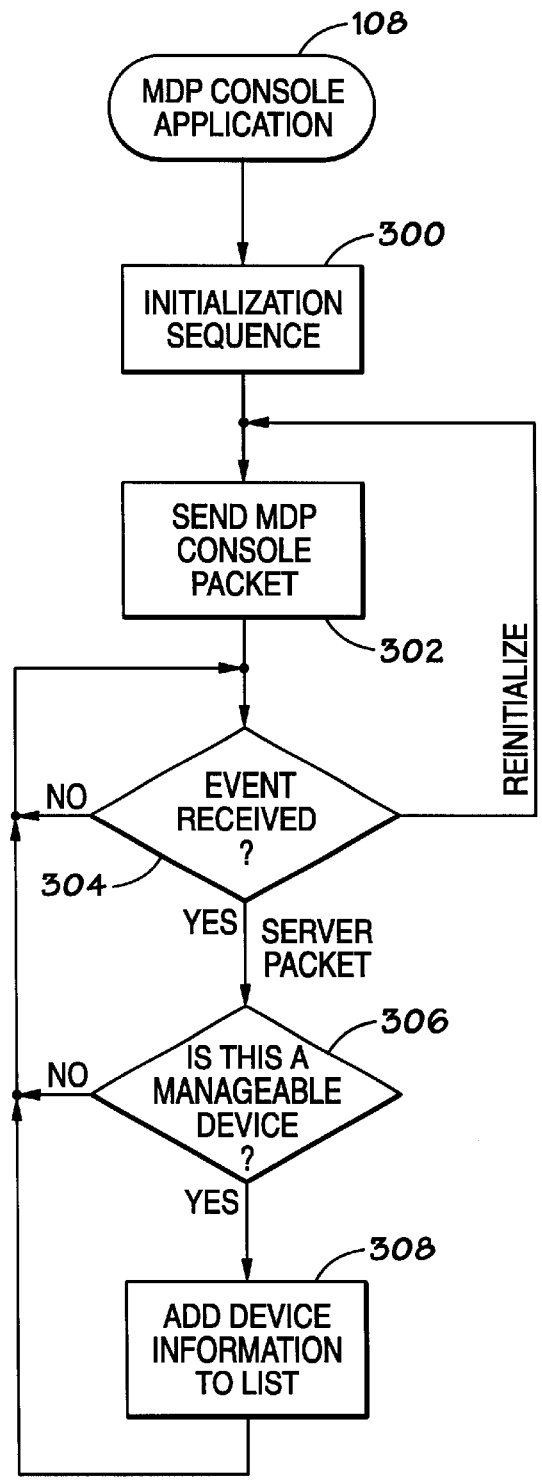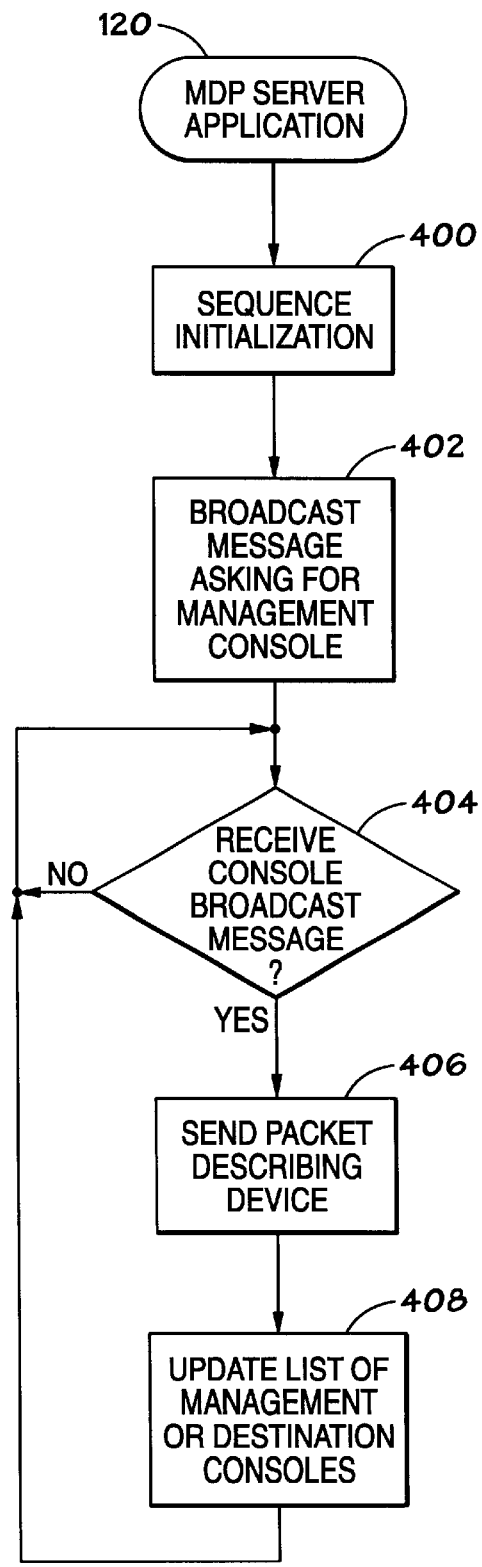

FIG. 5

| PARAMETERS | LENGTH | USE IN MDP |
|---|---|---|
| OPERATION | BYTE | ALWAYS BOOT_REPLY(2) |
| HARDWARE ADDRESS TYPE | BYTE | 1 |
| HARDWARE ADDRESS LENGTH | BYTE | 6 |
| HOP COUNT | BYTE | UNUSED |
| TRANSACTION ID | DWORD | VARIES BY CONTEXT |
| SECONDS SINCE BOOT | WORD | UNUSED |
| RESERVED | WORD | 0 OR 0X8000 (BCAST FLAG) |
| CLIENT IP ADDRESS | DWORD | UNUSED |
| YOUR IP ADDRESS | DWORD | UNUSED |
| BOOTSTRAP SERVER ADDRESS | DWORD | UNUSED |
| RELAY AGENT ADDRESS | DWORD | UNUSED |
| HARDWARE ADDRESS | BYTE [16] | UNUSED |
| HOST NAME | BYTE [64] | UNUSED |
| BOOT FILE NAME | BYTE [128] | UNUSED |
| OPTIONS | 64 BYTES MAX | SEE OPTIONS TABLE |

FIG. 6
(OPTIONS TABLE)

STANDARD MAGIC COOKIE

| TAG | LENGTH | VALUE |
|---|---|---|
| NONE | BYTE(4) | 99 130 83 99 |

HOST NAME OPERATION

| TAG | LENGTH | VALUE |
|---|---|---|
| 12 | BYTE(X) | HOST NAME |

VENDOR SPECIFIC INFORMATION

| TAG | LENGTH | VALUE |
|---|---|---|
| 43 | BYTE(X) | MDP OPTIONS |

FIG. 7

| CODE | LENGTH | DATA ITEM | | | CODE | LENGTH | | | |
|------|--------|-----------|-----|-----|------|--------|-----|-----|-----|
| T1 | n | d1 | d2 | ... | T2 | n | d1 | d2 | ... |

FIG. 8

MDP MAGIC COOKIE

| TAG | LENGTH | VALUE |
|-----|--------|-------|
| 01 | BYTE(4) | 222 175 250 222 |

COMPAQ ID

| TAG | LENGTH | VALUE |
|-----|--------|-------|
| 02 | BYTE(3) | "CPQ" |

DHCP IN USE

| TAG | LENGTH | VALUE |
|-----|--------|-------|
| 03 | BYTE(0) | NONE |

DEVICE TYPE

| TAG | LENGTH | VALUE | |
|-----|--------|-------|---|
| 61 | BYTE(1) | 1 | SERVER |
| | | 2 | CLIENT |
| | | 3 | ROUTER |
| | | 4 | BRIDGE |
| | | 5 | HUB |
| | | 6 | WORKSTATION |
| | | 255 | MANAGEMENT CONSOLE |

METHOD AND APPARATUS FOR IDENTIFYING DEVICES ON A NETWORK

BACKGROUND

The invention relates to identifying devices on a network.

With the large number of computing devices which can be connected to a network (made up of local area networks or LANs and wide area networks or WANs), various methods have been developed to identify and manage the network devices to enable communication among them. Typically, a network directory service, which is essentially a catalog or directory of names and addresses of network devices (such as servers, hubs, desktops, laptops, and other devices), is maintained on selected network devices. Devices within a LAN usually have their own route tables of other devices in the LAN to allow quick and efficient communication within the LAN. However, should a LAN device desire to communicate with a device outside the LAN, then the directory stored on a selected network device is accessed to determine the appropriate address of the target.

Methods of identifying computing devices on a network include exhaustive pinging and route table scanning. Both of these methods are implemented in the Open View network management product sold by Hewlett-Packard Company. In exhaustive pinging, selected servers on a network send out query packets for all addresses in a specified range. If a response is obtained for a particular address in the form of a packet, then the name and address of the responding device are added to a directory or catalog.

In route table scanning, used by networks implementing the Simple Network Management Protocol (SNMP), network devices determine the gateway systems on the network to access their route tables. The route tables contain the names and addresses of devices known to the gateway servers. The route table scanning method also accesses route tables of other known routers to determine devices that have routed through those routers. In this manner, a substantial portion of devices on the network can be identified.

In both the pinging and route table scanning methods, a large number of query packets are issued to identify network devices.

SUMMARY

The invention may have one or more of the following advantages. By reducing the number of query packets that need to be transmitted to perform the automatic discovery of devices, network traffic is reduced. Automatic discovery of computing devices on the network can be performed regardless of the network protocols used. Computing devices on a network can be reliably and efficiently discovered.

In general, in one aspect, the invention features a network system having network devices and a management device configured to transmit a message to request identification of network devices. Each of the network devices is configured to respond to the management device message by transmitting a reply message containing identification information of the responding device.

Implementations of the invention may include one or more of the following features. The management device includes a directory containing the identification information of the network devices, the identification information including the network device's network address. The management device is further configured to issue an acknowledge message to a responding network device, and to issue a secondary message to request identification of network devices from which the management device has not received a reply message. A network connects the management device and the network devices, the network carrying packets that comply with the TCP/IP protocol. The network device is further configured to notify the management device of a problem in the network device using management device information stored in the network device. In general, another aspect, the invention features a network system having a network, network devices connected to the network, and a management computer system having a processor and a memory, the processor being configured by a network management program to transmit a query packet over the network. The network devices each includes a processor configured to respond to the query packet by transmitting an identification packet to the management computer system. The information in the identification packets received from the responding network devices are stored in a directory located in the memory of the management computer system.

Implementations of the invention may include one or more of the following features. The network carries packets that comply with the TCP/IP protocol. The network includes a local area network and a wide area network.

In general, in another aspect, the invention features a computer system for use on a network having network devices. The computer system includes a port coupled to the network and a processor coupled to the port and configured by a program to issue a query message over the network. Network devices having a predetermined configuration respond to the query message by transmitting identification messages.

In general, in another aspect, the invention features a method of configuring a network, including transmitting a message seeking identification of predetermined types of devices connected to the network. Identification messages from the devices are received, and a directory of network devices is updated based on the identification messages.

In general, in another aspect, the invention features an apparatus for identifying devices on a network, including a first application running on a first computer system having instructions to cause the computer system to issue a query message. The apparatus further includes second applications running on second computer systems having instructions for causing each of the second computer systems to respond to the query message by transmitting an identification message. The first application updates a directory of second computer systems based on the identification messages.

In general, in another aspect, the invention features a computer system for use on a TCP/IP network having network devices. The computer system has a port coupled to the network, and a processor coupled to the port and configured to multicast a query message over the network. Network devices respond to the query message by transmitting identification messages. The computer system includes a storage element storing a directory containing information from the identification messages.

In general, in another aspect, the invention features a network device for connection to a network. The network device includes a port connected to the network to receive a query message seeking identification of predetermined network devices. The network device also includes a processor configured to respond to the query message by transmitting an identification message containing information identified the network device.

Other features and advantages will become apparent from the following description and from the claims.

BRIEF DESCRIPTION OF THE DRAWINGS

FIGS. 3 and 4 are flow diagrams of network management applications running on the management console and server systems.

FIG. 5 is a table showing the format of a bootstrap protocol (BOOTP) packet used for communication between the management console and server systems.

FIGS. 6, 7, and 8 illustrate options that are used in the BOOTP packet.

DETAILED DESCRIPTION

Figure 1:
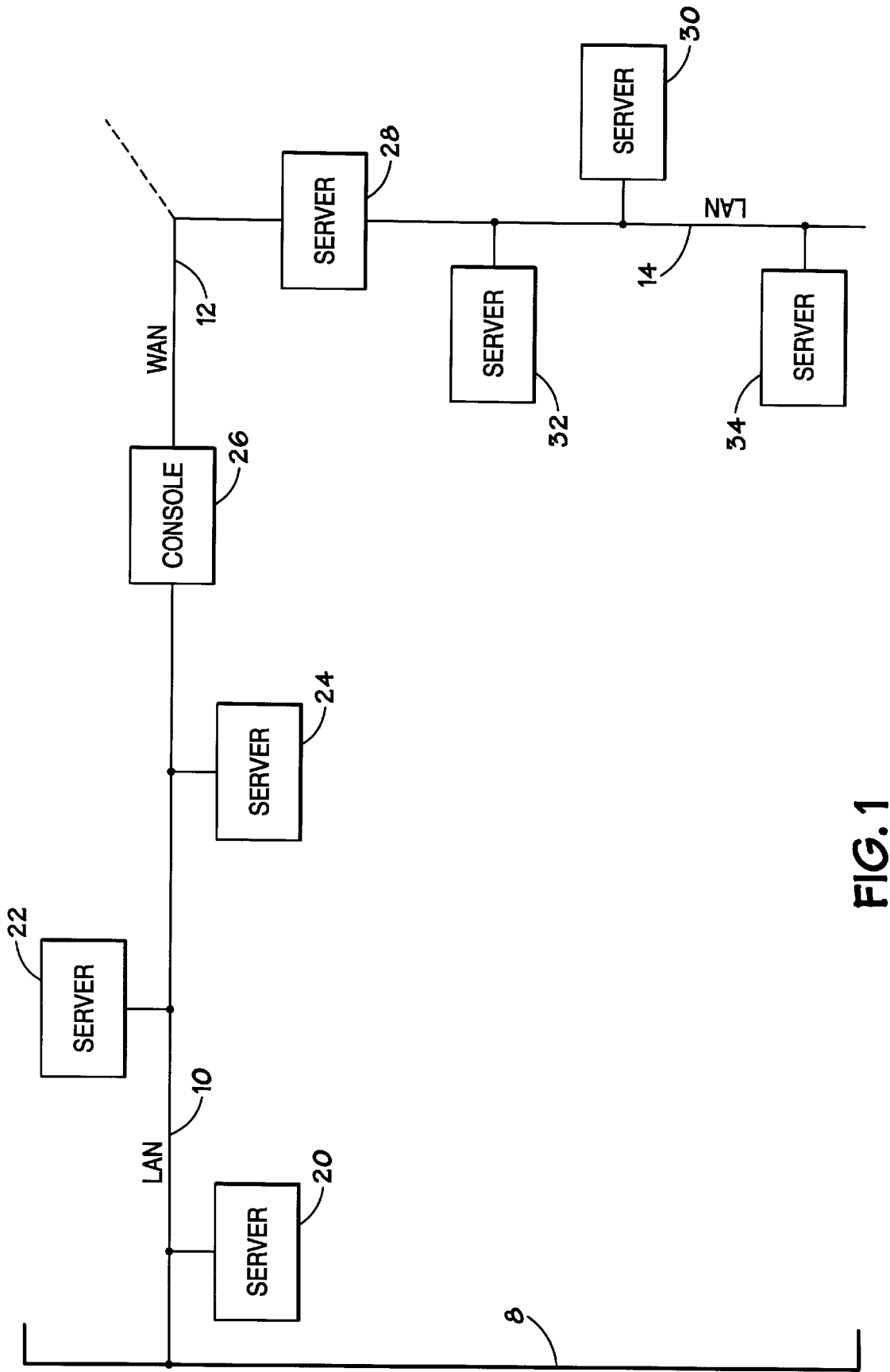
FIG. 1 is a block diagram of a network.

Referring to FIG. 1, an exemplary network 8 includes two local area networks (LANs) 10 and 14 and a wide area network (WAN) 12 connecting the two LANs. Computing devices 20, 22, 24 and 26 are connected to the LAN 10, and computing devices 28, 30, 32 and 34 are connected to the LAN 14. The devices can include desktop, laptop, hub, and gateway systems. For example, the gateway systems in the network 8 are the system 26 (gateway between the LAN 10 and the WAN 12) and the system 28 (gateway between the LAN 14 and the WAN 12). The network 8 can be a TCP/IP (transmission control protocol/internet protocol) or an IPX/SPX (a Novell Netware protocol) network.

A protocol, referred to as the "management discovery protocol" (MDP), is implemented on the network 8 to automatically discover manageable servers, which are computing devices on which predetermined software is loaded; for example, those devices running the Compaq Insight Manager® product sold by Compaq Computer Corporation.

In the management discovery protocol, network devices are divided into two groups: an MDP console system and an MDP server system. As used in this description, an MDP console system runs an MDP management console application that uses MDP to obtain a list of manageable servers on the network. An MDP server system runs an MDP server application that interacts with MDP consoles. In the example of FIG. 1, the network device 26 is an MDP console system, and all the other illustrated network devices are servers. More than one MDP console system can exist on the network 8.

To perform automatic network device discovery, the MDP console system issues a multicast query packet over the network 8. MDP server systems recognizing the query packet then respond by sending identification packets (including names and addresses of the responding devices) back to the MDP console system, which then adds the identification information to a directory stored in the MDP console system.

Figure 2:
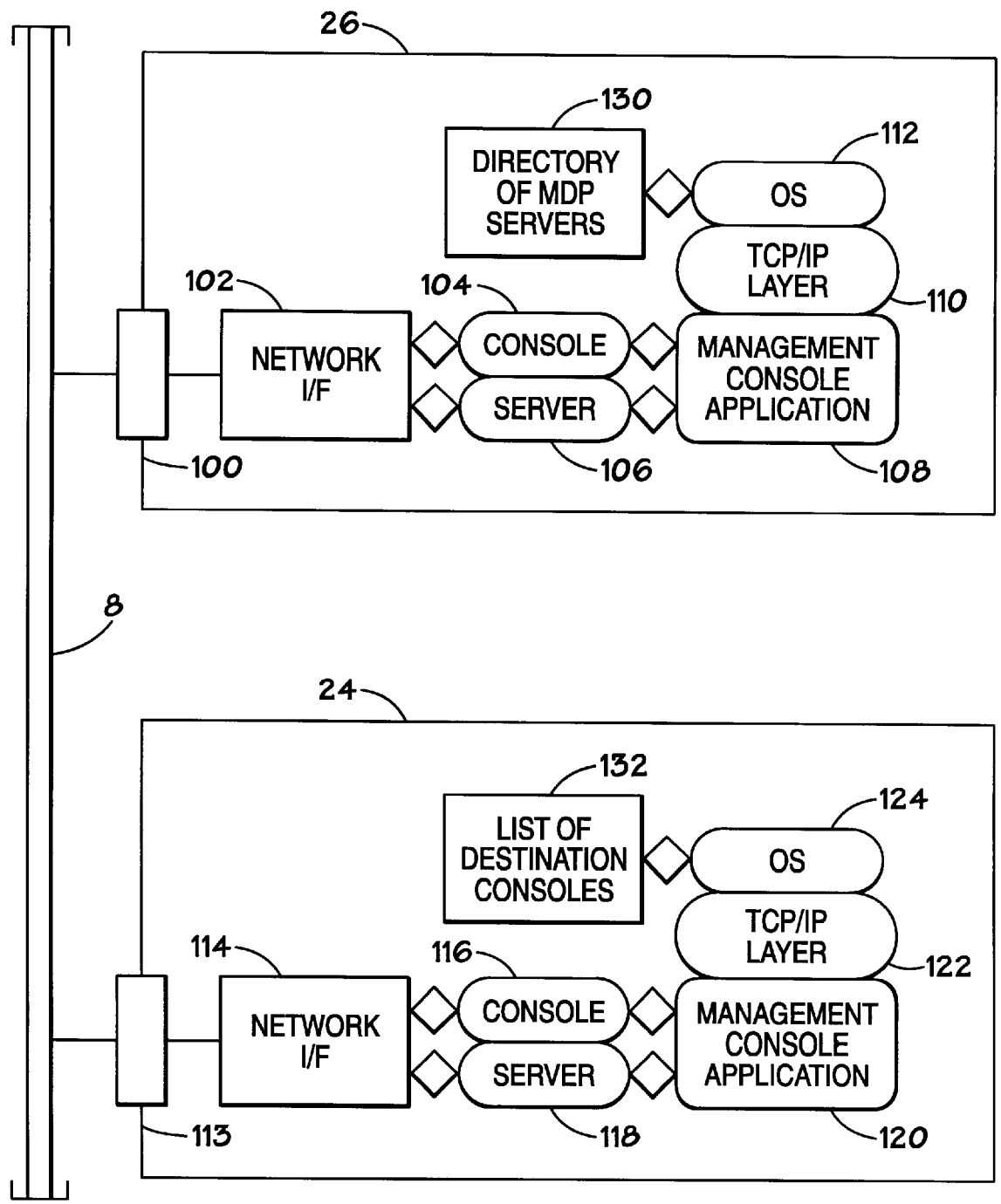
FIG. 2 is a block diagram of a management console system and a management server system connected to the network.

Referring to FIG. 2, the software layers in the MDP console system 26 and an MDP server system (such as server 24) are shown. The software layers of the MDP console system 26 communicate with the network 8 through a network interface 102 and a connector 100. The network interface 102 includes the hardware (including a network controller card, such as the one shown in FIG. 11) and the firmware controlling the hardware. The network interface 102 can communicate with a console port 104 and a server port 106, which in turn can communicate with the MDP console application 108. In the console system 26, transmissions originating from the MDP console application 108 to the network 8 are routed through the console port 104, while messages from the network 8 are received through the server port 106 and routed to the MDP console application 108.

A TCP/IP (or other network protocol) 110 software layer 110 sits above the MDP console application 108. The network protocol layer 110 transforms packets or messages from the network 8 into a format that can be understood by the operating system 112 (and other applications) of the MDP console system 26. Similarly, any messages from the operating system 112 to the network 8 are converted to the appropriate network format by the network software layer 110. In addition, a directory of MDP server systems is kept in a file 130 located in a storage device in the MDP console system 26. The directory 130 is used by the MDP console system 26 to keep track of all manageable devices on the network 8.

Similar layers are included in the server system 24, including a network connector 113, a network interface 114, a console port 116, a server port 118, an MDP agent or server application 120, a network protocol software layer 122, an operating system layer 124, and a file 132 containing a list of destination or management consoles. The list of destination consoles 132 can be kept by a server system so that the server knows which network device to contact regarding any problems. In the MDP server system 24, transmissions originating from the MDP agent application 120 are routed through the server port 118 to the network 8, and messages from the network 8 are routed through the console port 116 to the MDP agent application.

The MDP console application 108 and the MDP server application 120 can communicate over the network 8 according to the bootstrap protocol (BOOTP), which is a TCP/IP-based protocol that allows a booting host to configure itself dynamically and without user supervision. More details on the bootstrap protocol are discussed in Walt Wimer, "Clarifications in Extensions for the Bootstrap Protocol," Carnegie Mellon University, Request for Comments 1542 (October 1993); and Bill Croft & John Gilmore, "Bootstrap Protocol (BOOTP)," Request for Comments 951, Stanford University and Sun Microsystem (September 1985), which are hereby incorporated by reference.

A standard BOOTP packet is shown in FIG. 5, which contains several parameters. The third column of the table in FIG. 5 notes whether a BOOTP parameter is used in the management discovery protocol, and if so, the value assigned to the particular parameter. The BOOTP packet includes an options parameter having a maximum length of 64 bytes, shown in the bottom row of the table in FIG. 5.

The management discovery protocol uses three options: a standard "magic cookie" option, a host name option, and a vendor specific information option. The standard magic cookie option is used to identify a network packet as a BOOTP protocol packet, and is discussed in Steve Alexander & Ralph Droms, "DHCP Options and BOOTP Vendor Extensions," Request for Comments 1533, Lachman Technology, Inc. & Bucknell University (October 1993), which is hereby incorporated by reference. Each option in a BOOTP packet has three entries: a tag, its length, and an associated value. Thus, as shown in FIG. 6, the standard magic cookie option, which is not associated with a tag number, has a byte length of 4 and is associated with the 4-octet dotted decimal number 99.130.83.99 (or hexadecimal number 63.82.53.63) in a network byte order.

Another option used is the standard host name option, also illustrated in FIG. 6. The host name option contains a tag value of 12, a user selectable byte length, and a selected host name. This option is used to pass the name that the server system wishes to be identified by in the MDP server directory 130. A third option used in the management discovery protocol is the vendor specific information option, which is associated with tag 43 in the BOOTP protocol. The length of the vendor specific information option is determined by the amount of information that is included by a vendor. This option is used to exchange vendor-specific information. The information in the value field of the vendor specific information option is referred to as the vendor-specific extensions field and has the format illustrated in FIG. 7.

Referring to FIG. 8, the management discovery protocol includes the following vendor-specific extensions. The first extension is the MDP magic cookie, which has a tag value of 1, a length of 4 bytes, and a decimal value of 222.175.250.222. The MDP console and agent applications look for this value to determine if a BOOTP packet is an MDP packet. The next set of information bytes is the Compaq ID extension, which has a tag value of 2, a length of 3 bytes, and a predetermined value, such as "CPQ" to indicate that the packet is Compaq-specific. A third extension, which is the DHCP (dynamic host configuration protocol) extension, has a tag value of 3, a length of 0 bytes, and a null value. The DHCP extension notifies the MDP console application 108 or the MDP agent application 120 to obtain the transmitting device's address by name rather than by using the address returned in the MDP packet. The dynamic host configuration protocol, which provides a framework for passing configuration information to devices on a TCP/IP network and is based on the bootstrap protocol, is described in Ralph Droms, "Dynamic Host Configuration Protocol," Request for Comments 1541, Bucknell University (October 1993), which is hereby incorporated by reference.

Another extension is the device type extension, which has a tag value of 61 and the length of 1 byte, and contains a value indicating the type of device associated with the BOOTP packet, including a server, client, router, bridge, hub, workstation, or a management console system.

Referring to FIG. 3, the MDP console application 108 during power-up, performs an initialization sequence at step 300. Next, the MDP console application multicasts a message (e.g., a BOOTP packet) over the network 8 to query for manageable devices at step 302. A multicast differs from a broadcast in that a multicast is directed to a group of network devices sharing an IP destination address, whereas a broadcast is sent to all devices. Multicasting is described in S. Deering, "Host Extensions for IP Multicasting," Request for Comments 1054, Stanford Univ. (May 1988), which is hereby incorporated by reference. The multicast message goes to a group of devices that are interested in the query message (i.e., manageable devices). A multicast query message has a device type extension of 255 as illustrated in FIG. 8.

Next, the MDP console application 108 waits for the receipt of an event at step 304. If an event received is an MDP server packet (having a device type extension with the value one), then the MDP console application 108 determines at step 306 if the responding device is a manageable device by determining if the standard and MDP magic cookies are included in the packet. If the responding device is a manageable device, i.e., an MDP server, then the name, address and type of device is stored at step 308 in the directory of MDP servers 130 in the console system 26.

Another event that can be received at step 304 is a Reinitialize event, which can be a periodic event or a manually initiated event transmitted to cause the console system 26 to issue another multicast message to query for MDP servers at step 302. The Reinitialize event can be set to occur periodically, such as once an hour or once a day. Additionally, a manually initiated Reinitialize event can allow the administrator to update his or her list of MDP servers on demand. By reissuing a multicast, any response packets from MDP servers that may have been lost during a scheduled query can be picked up in the subsequent query.

Referring to FIG. 4, the MDP server application 120 performs an initialization sequence at step 400 during power up of the server system. After initialization, the MDP server application 120 transmits at step 402 a multicast message identifying itself to one or more MDP management consoles on the network 8. This packet (which is the same as the MDP server packet discussed above) from the server is received by the MDP console application 108 in the console system 26 (and in other console systems that might exist on the network 8), and the identification information in the packet is stored in the directory of MDP servers 130 in the MDP management consoles.

After initialization, the MDP server application 120 waits at step 404 to receive an MDP console multicast message (such as a query message from another MDP console on the network). If one is received, the MDP server application 120 responds by sending an MDP server packet describing the server device at step 406. Next, at step 408, the MDP server application 120 updates its list of management or destination consoles, which allows each MDP server to keep track of the MDP consoles on the network 8. One advantage offered by keeping such a list in the MDP servers is that, should a problem or failure occur in any particular server, the server would know which device to contact regarding the problem or failure.

Figure 9:
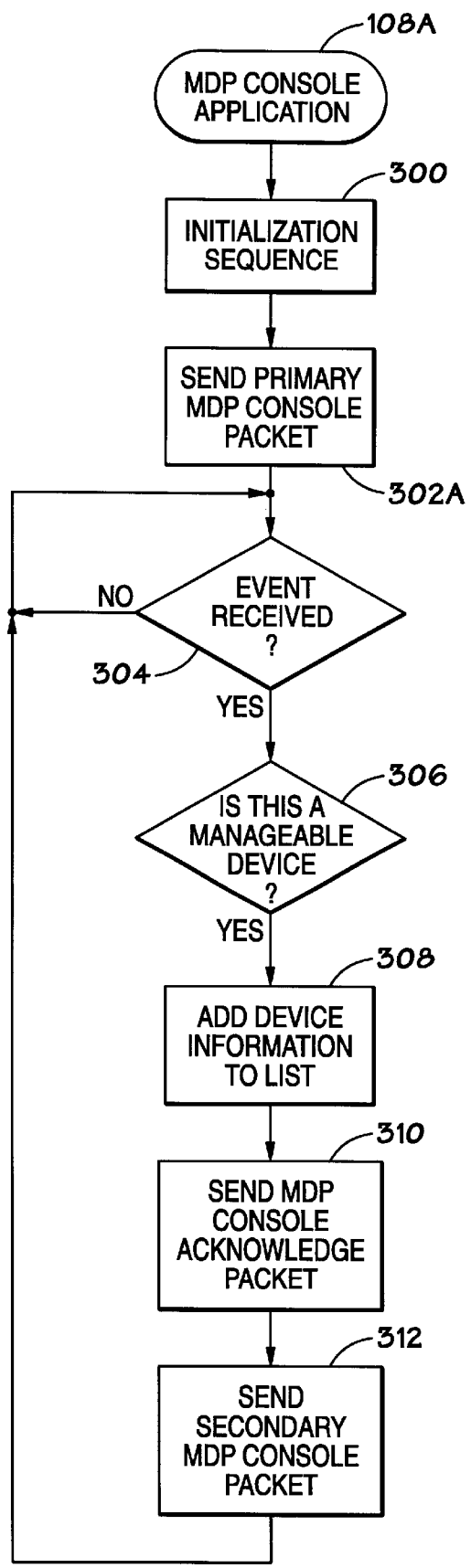
FIGS. 9 and 10 are flow diagrams of alternative network management applications running on the management console and server system.

Because of the likelihood that MDP server packets responding to the MDP console query may be lost on the network 8 due to traffic, an alternative two-level protocol can be implemented. Referring to FIG. 9, an MDP console application 108A, which runs in the console system 26, is used to implement a two-level multicast. The steps of the MDP console application 108A are identical to the steps of the MDP console application 108 in FIG. 3, except step 302 has been substituted with step 302A and steps 310 and 312 have been added.

At step 302A, after initialization of the MDP console application 108A, a primary MDP console packet is transmitted, which is identical to the MDP packet described in connection with FIG. 4 except for an additional flag identifying the packet as a primary multicast. Then, after the MDP console application 108A has added the responding server to the list of MDP servers 130 at step 308, the console application 108A transmits at step 310 an MDP console acknowledge packet, which is targeted to the responding MDP server and indicates to that server that its packet has been received. Next, at step 312, the console application 108A transmits a secondary MDP console packet, which is identical to the primary MDP console packet except for the value of the primary/secondary flag. The secondary MDP console packet is picked up by MDP servers that have not received the acknowledge packet from the MDP console.

The MDP server responds to the secondary multicast by retransmitting another MDP server packet.

Figure 10:
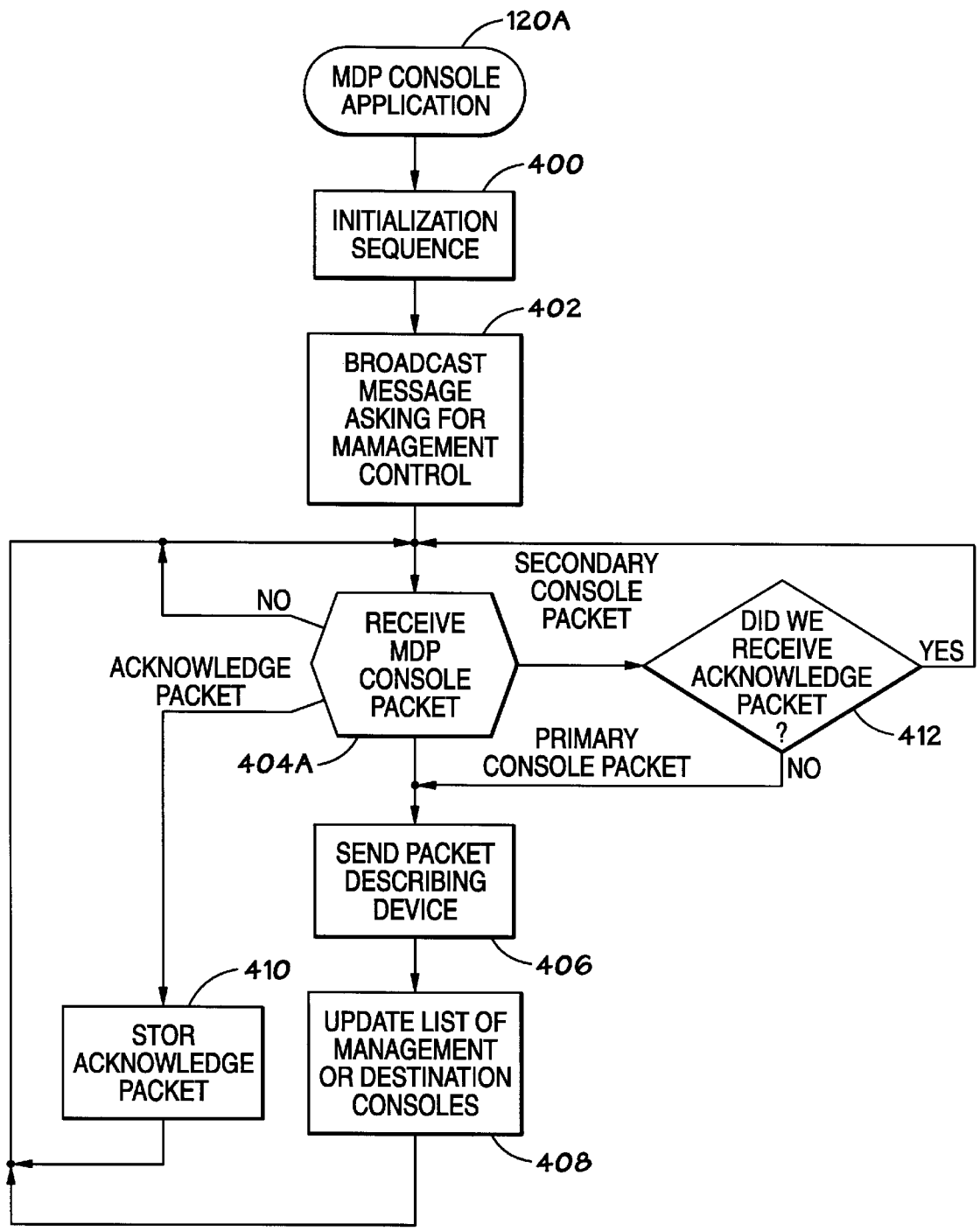

Referring to FIG. 10, an MDP server application 120A is identical to the MDP server application 120 of FIG. 4, except for step 404A (which replaces step 404), and the addition of steps 410 and 412. At step 404A, the MDP server application 120 determines if it has received a packet from an MDP console, which can be an acknowledge packet, a primary console packet, or a secondary console packet. If a primary console packet is received, then steps 406 and 408 are performed. If an acknowledge packet is received, then the acknowledge packet 410 is stored by the MDP server application 120A in a predefined storage location in the server system.

If a secondary console packet is received, then the MDP server application 120A determines if it has received an acknowledge packet. If not, then the prior packet transmitted by the server application 120A was probably lost, and as a result, the server application 120A retransmits the MDP server packet at step 406. If an acknowledge packet has been received, then the server application 120A does not need to respond.

Figure 11:
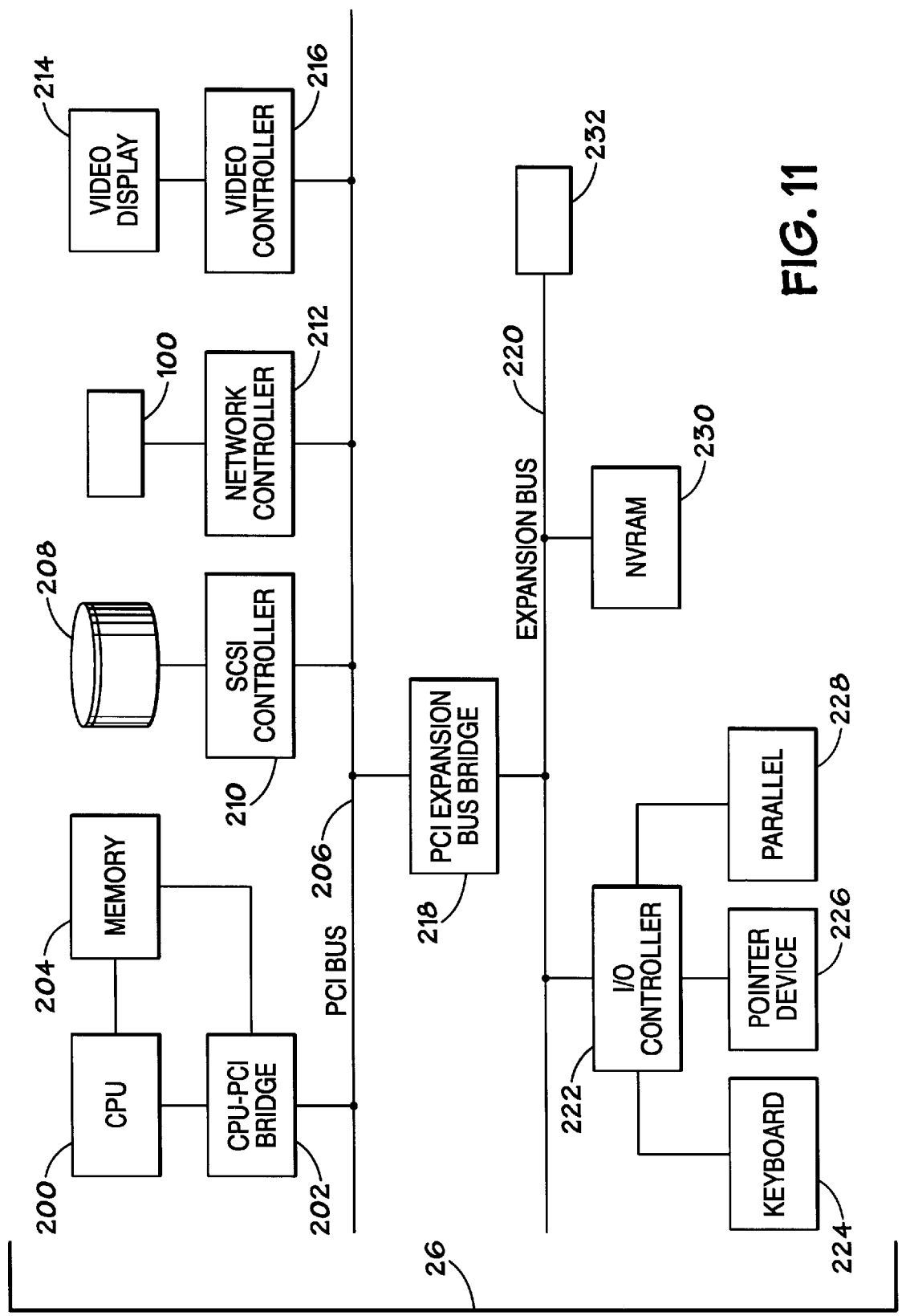
FIG. 11 is a block diagram of a computer system such as that used to implement the management console system.

Referring to FIG. 11, the physical components of an exemplary MDP console system 26 are illustrated. An MDP server system can also contain similar components. The system 26 includes a central processing unit (CPU) 200 connected by a CPU-PCI bridge 202 to a Peripheral Component Interconnect (PCI) bus 206. A main memory 204 is connected to the CPU 200 and CPU-PCI bridge 202. A mass storage device 208, in the form of hard disk drives, for example, is connected to a SCSI controller 210, which is in turn connected to the PCI bus 206. A network controller card 212, which is part of the network interface 102 or 114 described in FIG. 2, is also connected to the PCI bus 206. A video controller 216 controls signals transmitted between the PCI bus 206 and a video display 214.

An expansion bus 220, such as the Extended Industry Standard Architecture (EISA) or the Industry Standard Architecture (ISA) bus, is connected to the PCI bus 206 through a PCI-expansion bus bridge 218. The expansion bus 220 is connected to an input/output (I/O) controller 222, which provides interface ports to a keyboard 224, a pointer device 226 (such as a mouse), and a parallel port 228. The I/O controller 222 also controls access to a non-volatile random access memory (NVRAM) 230, which can be implemented with a flash memory or an EEPROM. The NVRAM is used to store the system BIOS for performing the power up sequence in the computer system 26. Expansion slots 232 are connected to the expansion bus 220 to provide further expansion capabilities.

Other embodiments are also within the scope of the following claims. For example, the steps performed by the MDP server application and the MDP console application can be varied and still achieve desirable results. Different packet formats (other than BOOTP packets) can be used to transmit the information between the MDP console applications and the MDP server applications. Although the TCP/IP and IPX/SPX networks have been mentioned as exemplary network protocols, other protocols are also contemplated. It is also contemplated that a broadcast method, rather than the multicast method described, could be used.

What is claimed is:

1. A network system, comprising:
   network devices; and
   a management device configured to transmit a message to request identification of network devices, the message including a primary/secondary flag;
   wherein each of the network devices is configured to respond to the transmitted management device message by transmitting a reply message containing identification information of the responding network device.

2. The network system of claim 1, wherein the management device includes a directory containing the identification information of the network devices.

3. The network system of claim 1, wherein the identification information includes the network device's network address.

4. The network system of claim 1, wherein the management device is further configured to issue an acknowledge message to a responding network device.

5. The network system of claim 4, wherein the management device is further configured to issue a secondary message to request identification of network devices from which the management device has not received a reply message.

6. The network system of claim 1, further comprising a network connecting the management device and the network devices, the network carrying packets that comply with the TCP/IP protocol.

7. The network system of claim 1, wherein a network device stores information about the management device, and wherein the network device is further configured to notify the management device of a problem in the network device using the management device information.

8. A computer system for use on a network having network devices, comprising:
   a port coupled to the network; and
   a processor coupled to the port and configured by a program to multicast a query message over the network, the query message including a primary indicator flag;
   wherein network devices having a predetermined configuration respond to the query message by transmitting identification messages.

9. The computer system of claim 8, further comprising a memory, the processor further being configured by the program to store information in the identification messages into a directory located in the memory.

10. The computer system of claim 8, wherein the query message includes a bootstrap protocol packet.

11. The computer system of claim 10, wherein the query message includes a predefined magic cookie that is separate from the standard magic cookie of the bootstrap protocol.

12. The computer system of claim 11, wherein the predefined magic cookie includes a value 222.175.250.222.

13. Apparatus for identifying devices on a network, comprising:
    a first application running on a first computer system having instructions to cause the first computer system to transmit a query message; and
    second application running on a second computer system having instructions for causing the second computer system to respond to the query message by transmitting an identification message;
    wherein the first application updates a directory of second computer systems based on the identification messages, and wherein the second application system updates a directory of first computer system responsive to the query message; and
    wherein the query message includes a primary/secondary flag recognizable by the second application.

14. The apparatus of claim 13, wherein the query message complies with the bootstrap protocol.

15. The apparatus of claim 14, wherein the query message includes a special magic cookie separate from the standard magic cookie of the bootstrap protocol.

16. The apparatus of claim 13, wherein the directory of first computer systems stores identification information of the first computer system.

17. The apparatus of claim 16, wherein each of the second computer systems is configurable to:
   read the identification information of the first computer system from the directory of first computer systems; and
   notify the first computer system of a problem in the second computer system.

18. A computer system for use in a TCP/IP network having network devices, comprising:
   a port coupled to the network;
   a processor coupled to the port and configured to multicast a query message over the network, the query message including a primary/secondary flag,
   wherein network devices responds to the query message by transmitting identification messages; and
   a storage element storing a directory containing information from the identification messages.

* * * * *

UNITED STATES PATENT AND TRADEMARK OFFICE
CERTIFICATE OF CORRECTION

PATENT NO.         : 6,249,814 B1
APPLICATION NO. : 08/934636
DATED                 : June 19, 2001
INVENTOR(S)       : David S. Shaffer et al.

It is certified that error appears in the above-identified patent and that said Letters Patent is hereby corrected as shown below:

Col. 8; line 3, after first occurrence of "message", please insert "having a primary flag indication"

Col. 8, line 3, after the letter "a" please insert "first"

Col. 8, line 4 please replace "." with "; and"

please add the following to the end of the claim "wherein each of the network devices is configured to respond to the message having a secondary flag indication by transmitting a second reply message containing identification information of the responding device if said first reply message was not acknowledged."

Col. 9, line 6, after "primary", please add "/ secondary"

In claim 15, line 8, after "message", please insert "having a primary flag indication"

In claim 15, line 9, before the occurrence of "identification", please insert "first"

In claim 15, line 9, please replace "messages" with "message"

In claim 15, please add the following to the end of the claim "wherein each of the network devices is configured to respond to the query message having a secondary flag indication by transmitting a second identification message if said first identification message was not acknowledged."

In claim 27, line 4, after "message", please insert "having a primary / secondary flag indication"

In claim 27, line 6, after "message", please insert "having a primary flag indication"

In claim 27, line 7, please replace "an" with "a first"

UNITED STATES PATENT AND TRADEMARK OFFICE
CERTIFICATE OF CORRECTION

| | |
|---|---|
| PATENT NO. | : 6,249,814 B1 |
| APPLICATION NO. | : 08/934636 |
| DATED | : June 19, 2001 |
| INVENTOR(S) | : David S. Shaffer et al. |

It is certified that error appears in the above-identified patent and that said Letters Patent is hereby corrected as shown below:

In claim 27, line 7, after "message", please insert "and for causing the second computer system to respond to the query message having a secondary flag indication by transmitting a second identification message if the first identification message was not acknowledged"

In claim 27, line 10, please replace ";and" with "."

In claim 27, lines 11-12, please delete "wherein the query message includes a primary/secondary flag recognizable by the second application."

In claim 34, line 7, after "message", please insert "having a primary flag indication"

In claim 34, line 8, after "transmitting", please insert "a first"

In claim 34, line 8, please replace "messages" with "message"

In claim 34, line 8, after "messages" please insert "and for causing the network devices to respond to the query message having a secondary flag indication by transmitting a second identification message if the first identification message was not acknowledged"

Signed and Sealed this

Twenty-ninth Day of August, 2006

JON W. DUDAS
*Director of the United States Patent and Trademark Office*